C. S. SHEPPARD.
NUT FOR MINING MACHINES.
APPLICATION FILED FEB. 17, 1916.
1,203,145.
Patented Oct. 31, 1916.
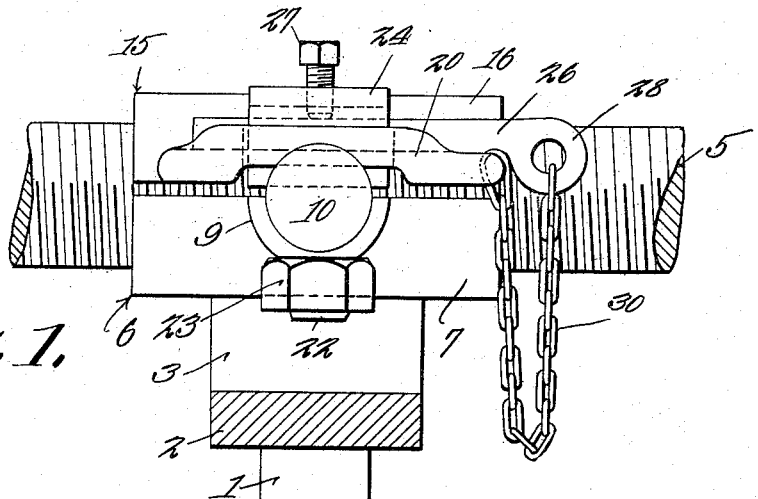
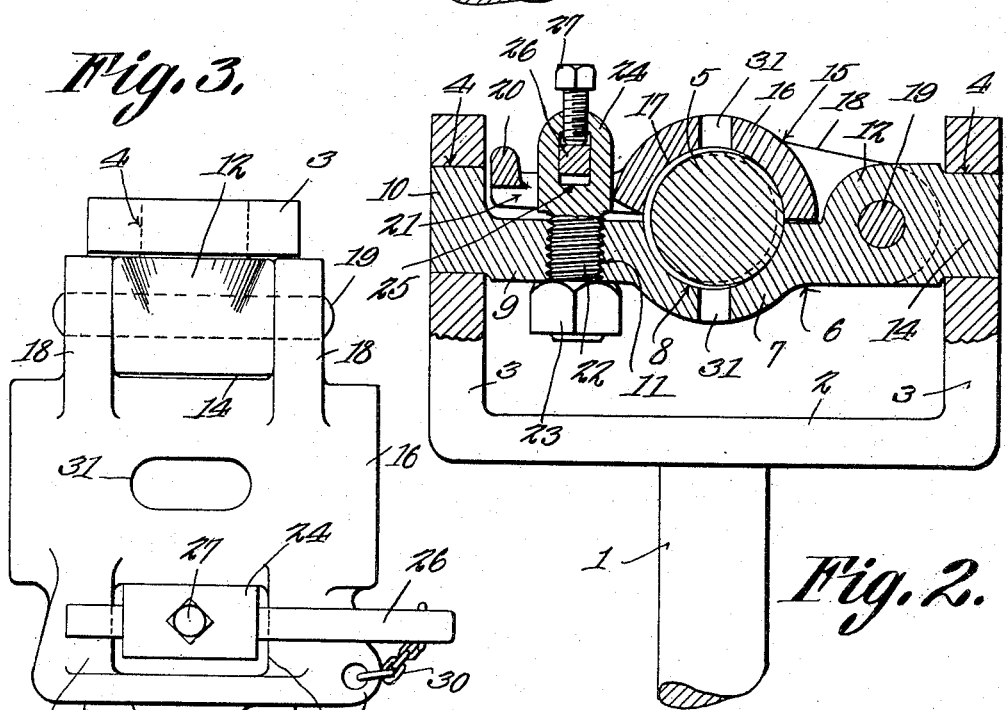
C. S. Sheppard,
Inventor,
by C. A. Snow & Co.
Attorneys.
Witnesses

UNITED STATES PATENT OFFICE.

CHARLES S. SHEPPARD, OF PITTSTON, PENNSYLVANIA.

NUT FOR MINING-MACHINES.

1,203,145.  Specification of Letters Patent.  Patented Oct. 31, 1916.

Application filed February 17, 1916. Serial No. 78,922.

*To all whom it may concern:*

Be it known that I, CHARLES S. SHEPPARD, a citizen of the United States, residing at Pittston, in the county of Luzerne and State of Pennsylvania, have invented a new and useful Nut for Mining-Machines, of which the following is a specification.

The device forming the subject matter of this application is a nut adapted to be employed upon a mining machine, and the primary object of the invention is to provide a nut which may be opened readily to receive the shaft of the mining machine.

Another object of the invention is to provide novel means whereby the constituent parts of the nut may be opened or adjusted with respect to each other and be held in adjusted positions.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in end elevation, a nut embodying the present invention, a portion of the supporting structure for the nut appearing in section; Fig. 2 is a transverse section of the nut, parts appearing in elevation, and the supporting structure for the nut appearing for the most part in elevation; Fig. 3 is a top plan of the nut and its mounting.

The nut forming the subject matter of this application is adapted for use under varying conditions and in different machines. By way of illustration, however, it may be assumed that the nut is adapted to be used in connection with a portable, hand operated mining machine including a support 1 carrying a yoke 2 having standards 3 equipped with bearing openings 4. A threaded shaft 5 is carried by the nut, the shaft 5 ordinarily being a drilling shaft.

The nut forming the subject matter of this application preferably is fashioned from metal throughout and embodies a lower or main member denoted by the numeral 6, the main member 6 including a trough-shaped body 7 which is internally threaded as shown at 8. Projecting laterally from one side of the body 7 is an arm 9 provided at its end with an upstanding, disk-like trunnion 10 mounted to rock in one of the bearing openings 4 of the supporting structure. In the arm 9 is fashioned a transverse threaded opening 11. The opposite side of the body 7 of the main member 6 is provided with a socket 12 carrying a laterally projecting trunnion 14 mounted to rock in one of the openings 4 of the supporting structure.

The invention comprises an auxiliary member 15 located above the main member 6 and including a trough-shaped body 16 which is internally threaded as shown at 17, the bodies 16 and 7 of the respective members coöperating to receive the threaded shaft 5. At one side, the body 16 of the auxiliary member 15 is provided with ears 18 located at the ends of the socket of the main member 6. Extended through the ears 18 and through the socket 12 is a pivot element 19, the auxiliary member 15 thus being movably connected with the main member 6. Projecting from the body 16 of the auxiliary member 15 and lying above the arm 9 of the main member 6 is an arm 20 provided with an elongated opening 21 located above the opening 8 in the arm 9 of the main member 6. The end of the arm 20 of the auxiliary member is housed behind the disk-like trunnion 10 of the main member, as will be entirely obvious from Fig. 2 of the drawings.

Threaded into the opening 11 in the arm 9 of the main member is a screw 22 provided with a lock nut 23 engaging the lower face of the arm 9. The screw 22 is equipped at its upper end with an elongated head 24, adapted to be received in the opening 21 of the auxiliary member. In the head 24 of the screw is fashioned a passage 25 receiving a removable, tapered key 26 which, coöperating with the arm 20, serves to hold the auxiliary member down on the main member, so that the body portions 7 and 16 of the members may receive the shaft 5. Threaded into the head 24 of the screw 22 is a set screw 27 coacting with the key 26. A hole 28 is fashioned in one end of the key 26, and a hole 29 is formed in the arm 20 of the auxiliary member, these holes being adapted to receive a flexible element 30 which serves to prevent a loss of the key 26. The body portions 7 and 16 of the nut are provided with openings 31, facilitating a lubrication of the shaft 5 and constituting a means whereby dirt or other foreign matter may be discharged.

In practical operation, the auxiliary member 15 is swung downwardly onto the main member 6, the head 24 of the screw 22 passing upwardly through the opening 21. The key 26 then is inserted into the passage 25 of the head of the screw and coacts with the arm 20 of the auxiliary member, to prevent the nut from opening. The set screw 27 then is tightened down onto the key and thus an accidental detachment of the key is prevented. Because the screw 22 is threaded into the arm 9, the screw may be adjusted endwise, and thus the passage 25 in the screw may be so located with the top of the arm 20 that the key 26 will coöperate with the arm 20. This feature, in combination with the set screw 27, gives a wide adjustment, whereby the key 26 may be made to coact with the arm 20. The nut 23 serves to prevent the screw 22 from rotating. The rotation of the screw 22 is undesirable for two reasons: first, because such a rotation varies the distance between the passage 25 and the upper face of the arm 20: and secondly, because if the screw is rotated, the elongated head 24 of the screw may not register properly with the opening 21 when the auxiliary member is closed down onto the main member. The utility of the lock nut 23, therefore, is clearly made out. The nut 23 constitutes a means whereby the head 24 of the screw may be positioned in an approximately correct relation to the arm 20 and the set screw 27 constitutes a means whereby minor variations may be taken care of, to the end that the key 26 may coöperate with the arm 20. Since the trunnions 14 and 10 are mounted to rock on the arms 3, a tilting movement may be imparted to the nut and the shaft which is carried thereby.

Having thus described the invention, what is claimed is:—

In a nut of the class described, pivotally connected main and auxiliary members including complemental, trough-shaped, internally threaded bodies, and arms projecting from the bodies, the arm of the auxiliary member being provided with an opening; a screw threaded through the arm of the main member and provided with a head located in the opening; a nut on the screw and coacting with the arm of the main member to prevent a rotation of the screw; a key removably inserted into the head and coacting with the arm of the auxiliary member; and a key-engaging clamping device movable in the head independently of the key.

In testimony that I claim the foregoing as my own, I have hereto affixed my signature in the presence of two witnesses.

CHARLES S. SHEPPARD.

Witnesses:
J. KENNETH ENGLISH,
JAMES GALLAGHER.

Copies of this patent may be obtained for five cents each, by addressing the "Commissioner of Patents, Washington, D. C."